US011075711B2

(12) United States Patent
Weng et al.

(10) Patent No.: US 11,075,711 B2
(45) Date of Patent: Jul. 27, 2021

(54) WIRELESS DEVICE SPECIFIC MAXIMUM CODE RATE LIMIT ADJUSTMENT

(71) Applicant: Telefonaktiebolaget LM Ericsson (publ), Stockholm (SE)

(72) Inventors: James Jianfeng Weng, Kanata (CA); Xixian Chen, Ottawa (CA); Hua Xu, Ottawa (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 358 days.

(21) Appl. No.: 16/095,825

(22) PCT Filed: Apr. 29, 2016

(86) PCT No.: PCT/IB2016/052457
§ 371 (c)(1),
(2) Date: Oct. 23, 2018

(87) PCT Pub. No.: WO2017/187236
PCT Pub. Date: Nov. 2, 2017

(65) Prior Publication Data
US 2021/0036799 A1     Feb. 4, 2021

(51) Int. Cl.
*H04L 1/00* (2006.01)
*H04W 28/02* (2009.01)
(52) U.S. Cl.
CPC ....... *H04L 1/0002* (2013.01); *H04W 28/0257* (2013.01)
(58) Field of Classification Search
None
See application file for complete search history.

(56) References Cited

U.S. PATENT DOCUMENTS 8,094,739 B2   1/2012   Nogami et al.
8,514,957 B2   8/2013   Nammie et al.
(Continued)

FOREIGN PATENT DOCUMENTS

WO   2003/019838 A1   3/2003
WO   2008/025366 A1   3/2008

OTHER PUBLICATIONS

International Search Report and Written Opinion dated Jan. 5, 2017 issued in corresponding PCT Application No. PCT/IB2016/052457, consisting of 9 pages.
3GPP TS 36.211 V12.1.0 (Mar. 2014) 3rd Generation Partnership Project; Technical Specification Group Radio Access Network; Evolved Universal Terrestrial Radio Access (E-UTRA); Physical Channels and Modulation (Release 12) consisting of 120 pages.
(Continued)

*Primary Examiner* — Kodzovi Acolatse
*Assistant Examiner* — The Hy Nguyen
(74) *Attorney, Agent, or Firm* — Sage Patent Group

(57) ABSTRACT

According to one aspect of the disclosure, a network node for adjusting a maximum channel code rate limit of a wireless device is provided. The network node includes processing circuitry. The processing circuitry includes a processor and a memory. The memory contains instructions that, when executed by the processor, configure the processor to: cause transmission, to the wireless device, of at least one data transmission coded at a maximum channel code rate that is one of less than and equal to a maximum channel code rate limit, receive at least one indication of reception of the at least one data transmission coded at the maximum channel code rate by the wireless device, and in response to receiving the at least one indication of reception associated with the at least one data transmission coded at the maximum channel code rate, modify the maximum channel code rate limit.

30 Claims, 9 Drawing Sheets

(56) References Cited

U.S. PATENT DOCUMENTS

| | | |
|---|---|---|
| 8,537,750 B2 | 9/2013 | Jin et al. |
| 8,699,340 B2 | 4/2014 | Fantaye et al. |
| 8,761,108 B2 | 6/2014 | Ren et al. |
| 8,953,517 B2 | 2/2015 | Soong et al. |
| 2006/0093058 A1* | 5/2006 | Skraparlis ............. H04L 1/1867 375/267 |
| 2008/0168332 A1* | 7/2008 | Palanki ................. H04L 1/0007 714/776 |
| 2010/0303016 A1 | 12/2010 | Jin et al. |
| 2010/0316066 A1* | 12/2010 | Leung ................. H04N 21/6336 370/468 |
| 2015/0003408 A1 | 1/2015 | Li |
| 2015/0188663 A1 | 7/2015 | Park et al. |
| 2015/0296394 A1* | 10/2015 | Svedman ............. H04L 47/266 370/223 |

OTHER PUBLICATIONS

3GPP TS 36.212 V10.9.0 (Sep. 2015) 3rd Generation Partnership Project; Technical Specification Group Radio Access Network; Evolved Universal Terrestrial Radio Access (E-UTRA); Multiplexing and Channel Coding (Release 10) consisting of 79 pages.

3GPP TS 36.213 V10.9.0 (Feb. 2013) 3rd Generation Partnership Project; Technical Specification Group Radio Access Network; Evolved Universal Terrestrial Radio Access (E-UTRA); Physical Layer Procedures (Release 10) consisting of 126 pages.

3GPP TS 36.104 V11.4.0 (Mar. 2013) 3rd Generation Partnership Project; Technical Specification Group Radio Access Network; Evolved Universal Terrestrial Radio Access (E-UTRA); Base Station (BS) Radio Transmission and Reception (Release 11) consisting of 134 pages.

* cited by examiner

WIRELESS DEVICE SPECIFIC MAXIMUM CODE RATE LIMIT ADJUSTMENT

CROSS-REFERENCE TO RELATED APPLICATIONS

This application is a Submission Under 35 U.S.C. § 371 for U.S. National Stage Patent Application of International Application Number: PCT/IB2016/052457, filed Apr. 29, 2016 entitled "WIRELESS DEVICE SPECIFIC MAXIMUM CODE RATE LIMIT ADJUSTMENT," the entirety of which is incorporated herein by reference.

TECHNICAL FIELD

The present disclosure relates to wireless communication networks, and in particular, to wireless communication networks adjusting a wireless device communication code rate limit.

BACKGROUND

Channel Coding

In wireless communications, in order to protect the information bits to be transmitted on a selected radio resource, physical layer processing performs cyclic redundancy check (CRC) attachment, segmentation, interleaving, and encoding of incoming information bits into coded bits. As a result, the information bits are sent on a block by block basis. A block of information bits in each transmission is also referred to as a transport block (TB) in physical layer. In some applications, one TB can be further chopped into multiple code blocks if the TB size is large and each code block can have its own CRC and its own encoding. This is known as segmentation. In 3GPP (3rd Generation Partnership Program) LTE (Long Term Evolution) and LTE-advanced standards, that type of physical layer processing is done before the coded bits are mapped to resource elements (RE) as described in 3GPP TS 36.212 v10.9.0 and 3GPP TS 36.211 v12.1.0.

Using LTE as an example, in FIG. 1, a simplified version of the physical layer transport block processing is shown. The information bearing bits selected to be transmitted in a physical layer transport block are protected by the addition of CRC bits (Block S100). The addition of the CRC bits to the transport block permits channel induced error detection and correction. The transport block may be protected by one or more CRC elements, where the first CRC is a transport block CRC for the complete transport block. This is shown in the equation below, $$B = A + L \quad \text{(Eq. 1)}$$

where A is the number of information bearing bits in a transport block passed down to the physical layer from higher layers, L is the size of the CRC (L=24 bits, for example), and B is the resulting number of information bits in the transport block plus the number of CRC protection bits.

For LTE Physical Downlink Shared Channel (PDSCH) transmissions, subsequent CRCs are used if the initial transport block of size (Abits) plus its CRC (L bits), giving the block of bits B, requires segmentation into smaller code blocks (Block S102). Each segmented code block will get its own CRC, also of size L, and the resulting bits for a given code block, block k, is denoted by $c_k$. There may be K code blocks from 0 to K-1 and their corresponding bits are denoted by $\{c_0, c_1, c_2 \ldots c_{K-1}\}$.

The resulting one or more code blocks are sent to the channel coding stage where interleaving and turbo (for PDSCH) coding take place (Block S104) to add parity bits for protection. The output bits from the channel coding stage are referred to as channel coded bits. LTE uses a fixed ⅓rd turbo encoder which results in three times more bits at the output than the number of bits input into the channel coding block. In order to: match the varying conditions of the channel, meet the code rate determined in the Medium Access Control (MAC) layer and fit the payload plus its CRC(s) into the allocated LTE Orthogonal Frequency Division Multiplexing (OFDM) resource, the coded bits are selected and pruned.

After channel coding, bit selection and pruning are performed. The selected and pruned coded bits, known as the rate matched coded bits (Block S106), are denoted as:
$\{e_0, e_1, e_2 \ldots e_{K-1}\}$ In 3GPP LTE and LTE-advanced standards, the smallest element for scheduling is the scheduling block (SB), which is composed of two resource blocks (RB). Each RB is 12 resource elements (RE) in the frequency domain by 7 (normal Cyclic Prefix (CP)) or 6 (extended CP) OFDM symbols in the time domain Each RE within the scheduling block is one OFDM sub-carrier in the frequency domain for the duration of one OFDM symbol. The rate matched coded bits, hereinafter referred to as code bits, are mapped to modulated symbols after using the most appropriate modulation and coding scheme (MCS), where the MCS is selected to achieve the maximum data rate considering the block error rate (BLER) given the wireless device reported measured channel conditions. The number of REs available to the downlink scheduler for the transmission of the PDSCH transport block is determined by counting the number of REs that are available for the PDSCH transmission in the scheduling resource blocks assigned to the particular wireless device, minus the REs that are not available or used for other purposes such as, but not limited to, reference signals, synchronization signals and REs in the control region. The remaining REs that are available for the PDSCH are denoted as NRE_PDSCH.

Effective Code Rate

Effective coding rate, defined as the ratio of the number of information bits in a TB plus cyclic redundancy check (CRC) bits for all code blocks to the total number of raw physical layer bits used to transmit the TB is one of the measures in downlink (DL) scheduling. The effective code rate for the transmission for user i, i.e., wireless device i, is calculated by dividing the total number of data bit plus all CRC overhead bits ($N_{payload, user\ i} + N_{TOTAL\_CRC, user\ i}$) by the number of available raw physical layer bits in the assigned physical layer resource ($N_{PHY, user\ i}$) as illustrated in Equation 2.

$$CR_{Effective,\ user\ i} = (N_{payload,\ user\ i} + N_{TOTAL\_CRC,\ user\ i})/N_{PHY,\ user\ i} \quad \text{(Eq. 2)}$$

In the following, for notational simplicity, the subscript user i is omitted. The number of physical layer bits $N_{PHY}$ is the product of the number of available PDSCH REs assigned to the user i ($N_{RE\_PDSCH}$), the number of bits per RE (modulated symbol) ($N_s$) and the number of layers used if a Multiple Input Multiple Output (MIMO) transmission is chosen ($N_{layers}$).

$$N_{PHY} = N_{RE\_PDSCH} * N_s * N_{layers} \quad \text{(Eq. 3)}$$

Using equation (1), $N_{payload} + N_{TOTAL\_CRC}$ can be written as $$N_{payload} + N_{TOTAL\_CRC} = A + [(N_{CB} + 1) * L]\} \quad \text{(Eq. 4)}$$

where $N_{CB}$ is the number of code blocks.

The effective code rate for user i is given by:

$$CR_{Effective} = \{A + [(N_{CB}+1)*L]\} / (N_{RE\_PDSCH} * N_s * M_{layers}) \quad \text{(Eq. 5)}$$

A higher effective code rate typically implies a good channel quality was reported for a given set of channel resources that is assigned to the wireless device and therefore fewer parity bits are required to protect the information bearing bits referred to as data bits.

In each sub-frame, the network node's downlink scheduler invokes link adaptation (LA) with the purpose of choosing a transport block size that makes optimal use of the wireless device's downlink channel conditions. If the wireless device's channel conditions are good, implying a higher signal to noise ratio (SNR), a higher modulation and coding scheme (MCS) may be selected. Then, based on the number of bits that the wireless device requested, the network node will determine the transport format for transmission. The transport format selected by the network node is composed of the transport block size, number of resource blocks and modulation and coding scheme to use. The network node then sends the chosen transport format (MCS, resource allocation, number of code words and precoding) to the wireless device via downlink control information (DCI) in the downlink control region. Given the transport format information, the wireless device's decoder will be able to look up the transport block size using 3GPP TS 36.213 section 7.1.7.2 v10.9.0 and then attempt to do the decoding.

Maximum Code Rate Limit

Often, when the channel conditions are good (e.g., with higher signal to noise ratios (SNRs)), such as when the wireless device is in proximity to the network node, a large transport block size could initially be chosen by the downlink scheduler which results in an effective code rate, which may be greater than the standard's, e.g., LTE's, maximum code rate limit. In LTE, the maximum code rate limit is 0.931. Usually, the network node's downlink scheduler reduces the effective code rate below the maximum LTE code rate of 0.931 to ensure wireless devices decode the transmitted transport block as described in section 7.1.7 of 3GPP TS 36.213: "The [wireless device] may skip decoding a transport block in an initial transmission if the effective channel code rate is higher than 0.931, where the effective channel code rate is defined as the number of downlink information bits (including CRC bits) divided by the number of physical channel bits on PDSCH. If the [wireless device] skips decoding, the physical layer indicates to higher layer that the transport block is not successfully decoded."

As specified in 3GPP TS36.213, a wireless device may skip decoding if the wireless device determines that the effective code rate is higher than the LTE maximum code rate of 0.931 by decoding the DCI and performing the same calculation as described in Eq. 5 using the MCS index and resource allocation and number of layers sent by the network node to the wireless device.

If the assumption is made that all wireless devices will follow the code rate limitation described in section 7.1.7 of 3GPP TS 36.213, the network node may be designed to not risk transmitting a transport block which results in a code rate that is higher than the LTE maximum code rate of 0.931 and therefore the network node reduces the transport block size and/or MCS. This limits the maximum throughput that can be achieved because the network node chooses a smaller transport block and MCS than is actually warranted, despite good channel quality and the possibility that a larger high code rate ($CR_{Effective}$>0.931) transport block could be successfully decoded.

Wireless Device Category

The concept of the maximum code rate limit is different from the limit on TB size or MCS that may be derived from wireless device categories. Basically, a wireless device may signal its wireless device category to a network node to indicate the wireless device's capability, part of which is on the maximum TB size or MCS it can support. That information will be taken into account in the network node downlink scheduling such that the selected TB size and MCS are within the limit that the wireless device signaled. On top of that, for a given set of resources allocated to the wireless device, such as user i, i.e., wireless device i, the selected TBS will determine the number of payload bits, i.e., $N_{playload, user\ i}$, and the corresponding number of CRC bits, i.e., $N_{TOTAL\_CRC, user\ i}$, while the selected resources allocated to the wireless device will determine the number of $N_{PHY, user\ i}$. Together, $N_{playload, user\ i}$, $N_{TOTAL\_CRC, user\ i}$, and $N_{PHY, user\ i}$ determine the effective code rate as expressed in Eq. 2. The maximum code rate limit sets forth that, in addition to meeting the limit on the TB size and MCS, the scheduler needs to meet the maximum code rate limit. Otherwise, some wireless devices may skip decoding the initial transmission if the effective code rate is larger than the limit and wait for the retransmission, resulting in the overall code rate being reduced by approximately half as two transmissions, i.e., the initial transmission and the retransmission, are used to send the same TB.

One of the reasons for setting a maximum code rate limit is for the wireless device to save some battery energy/power. In particular, considering that the transmit signal from a network node is not perfect and has distortion, which can be measured by an error vector magnitude (EVM); and at a certain EVM level, there exists a code rate limit such that decoding of a transport block with the code rate beyond the code rate limit will likely fail (not always but likely), it appears that from the battery energy saving point of view, there is no need to try decoding for the code rate beyond that limit. For example, LTE specifies EVM no larger than 6% for 64 Quadrature Amplitude Modulation (QAM) and no larger than 3% for 256QAM. LTE also specifies the code rate limit of 0.931.

Often, in PDSCH link adaptation, the network node's scheduler takes a conservative approach by considering that wireless devices will skip decoding a transport block if the effective channel code rate in a new transmission is higher than the LTE maximum code rate of 0.931. As a result, the scheduler usually checks the effective code rate and reduces the TB size or increase the allocated number of REs to keep the effective code rate <=0.931. In other words, a hard limit on the maximum code rate is applied for each PDSCH transmission.

However, taking a conservative approach by assuming a fixed code rate limit for all wireless devices actually limits the peak throughput for certain wireless devices with better decoding capability or in good channel conditions. Further, the battery energy saving consideration as mentioned above is good for wireless device in mobility. For wireless devices or other receivers that have their power supply plugged in, there is little if any need to consider the battery energy savings, and those wireless devices can try decoding the transport blocks regardless of the code rate limit. Another consideration is that transmit signals from network nodes often have a much better quality with EVM levels which are much lower than the ones specified by the 3GPP standard such as Table 6.5.2-1 EVM requirements in 3GPP TS36.104 v11.4. That means successful decoding for transport blocks with code rates beyond the specific limit is very likely. This is also indicated in that some wireless device vendors may design wireless devices to decode transport blocks with code rate beyond the code rate limit. Furthermore, when imposing a code rate limit and reducing the TB size to meet the code rate limit of 0.931, the newly selected TB size may be 2% smaller if the same MCS is used but the number of scheduling blocks is reduced or may be 10% to 15% smaller if the same number of resource blocks is used due to the set of limited TB sizes supported by 3GPP TS 36.213, Sec. 7.1.7, resulting in a noticeable throughput drop.

SUMMARY

Some embodiments advantageously provide a method, device and system for wireless device specific maximum code rate adjustment.

According to one aspect of the disclosure, a network node for adjusting a maximum channel code rate limit of a wireless device is provided. The network node includes processing circuitry. The processing circuitry includes a processor and a memory. The memory contains instructions that, when executed by the processor, configure the processor to: cause transmission, to the wireless device, of at least one data transmission coded at a maximum channel code rate that is one of less than and equal to a maximum channel code rate limit, receive at least one indication of reception of the at least one data transmission coded at the maximum channel code rate by the wireless device, and in response to receiving the at least one indication of reception associated with the at least one data transmission coded at the maximum channel code rate, modify the maximum channel code rate limit.

According to one embodiment of this aspect, the at least one indication of reception of the at least one data transmission by the wireless device is at least one positive indication of reception. According to another embodiment of this aspect, the at least one positive indication of reception is at least one hybrid automatic repeat request, HARQ, positive acknowledgement, ACK. According to another embodiment of this aspect, the modifying of the maximum channel code rate limit includes: if the indication of reception of the at least one data transmission by the wireless device is at least one positive indication, increasing the maximum channel code rate limit of the wireless device by an amount. According to another embodiment of this aspect, the increase of the maximum channel code rate limit of the wireless device by the amount occurs if the maximum channel code rate limit of the wireless device plus the amount is less than a maximum level on the maximum channel code rate limit. According to another embodiment of this aspect, the amount is a predetermined amount for the increase of the maximum channel code rate limit. According to another embodiment of this aspect, the amount for the increase of the maximum channel code rate limit is an amount where the modified maximum channel rate limit is reached in a later data block selection.

According to another embodiment of this aspect, the indication of reception of the at least one data transmission by the wireless device is at least one negative indication of reception. According to another embodiment of this aspect, the at least one negative indication of reception is a hybrid automatic repeat request, HARQ, negative acknowledgment, NACK. According to another embodiment of this aspect, the modifying of the maximum channel code rate limit includes: if the indication of reception of the at least one data transmission by the wireless device is at least one negative indication, decreasing the maximum channel code rate limit of the wireless device by an amount. According to another embodiment of this aspect, the decrease of the maximum channel code rate limit of the wireless device by the amount occurs if the maximum channel code rate limit of the wireless device minus the amount is one of greater than or equal to a minimum level on the maximum channel code rate limit. According to another embodiment of this aspect, the amount is a predetermined amount for the decrease of the maximum channel code rate limit. According to another embodiment of this aspect, the amount for the decrease of the maximum channel code rate limit is an amount where the modified maximum channel rate limit is reached in a later data block selection.

According to another embodiment of this aspect, the at least one indication of reception of the at least one data transmission by the wireless device is a plurality of indications of reception, and the modifying of the maximum channel code rate limit occurs in response to receiving the plurality of indications of reception.

According to another embodiment of this aspect, the memory contains further instructions that, when executed by the processor, configure the processor to: transmit, to the wireless device, at least one data transmission coded at the modified maximum channel code rate, receive at least one positive indication of reception of the at least one data transmission coded at the modified maximum channel code rate by the wireless device, and in response to receiving the at least one positive indication of reception associated with the at least one data transmission coded at the modified maximum channel code rate, increase the modified maximum channel code rate limit.

According to another embodiment of the disclosure, a method of operation of a network node for adjusting a maximum channel code rate limit of a wireless device is provided. At least one data transmission coded at a maximum channel code rate that is one of less than and equal to a maximum channel code rate limit is transmitted to the wireless device. At least one indication of reception of the at least one data transmission coded at the maximum channel code rate by the wireless device is received. In response to receiving the at least one indication of reception associated with the at least one data transmission coded at the maximum channel code rate, the maximum channel code rate limit is modified.

According to one embodiment of this aspect, the at least one indication of reception of the at least one data transmission by the wireless device is at least one positive indication of reception. According to another embodiment of this aspect, the at least one positive indication of reception is at least one hybrid automatic repeat request, HARQ, positive acknowledgement, ACK. According to another embodiment of this aspect, the modifying of the maximum channel code rate limit includes: if the indication of reception of the at least one data transmission by the wireless device is at least one positive indication, increasing the maximum channel code rate limit of the wireless device by an amount. According to another embodiment of this aspect, the increase of the maximum channel code rate limit of the wireless device by the amount occurs if the maximum channel code rate limit of the wireless device plus the amount is less than a maximum level on the maximum channel code rate limit. According to another embodiment of this aspect, the amount is a predetermined amount for the increase of the maximum channel code rate limit. According to another embodiment of this aspect, the amount for the increase of the maximum channel code rate limit is an amount where the modified maximum channel rate limit is reached in a later data block selection.

According to another embodiment of this aspect, the indication of reception of the at least one data transmission by the wireless device is at least one negative indication of reception. According to another embodiment of this aspect, the at least one negative indication of reception is a hybrid automatic repeat request, HARQ, negative acknowledgment, NACK. According to another embodiment of this aspect, the modifying of the maximum channel code rate limit includes: if the indication of reception of the at least one data transmission by the wireless device is at least one negative indication, decreasing the maximum channel code rate limit of the wireless device by an amount. According to another embodiment of this aspect, the decrease of the maximum channel code rate limit of the wireless device by the amount occurs if the maximum channel code rate limit of the wireless device minus the amount is one of greater than or equal to a minimum level on the maximum channel code rate limit. According to another embodiment of this aspect, the amount is a predetermined amount for the decrease of the maximum channel code rate limit. According to another embodiment of this aspect, the amount for the decrease of the maximum channel code rate limit is an amount where the modified maximum channel rate limit is reached in a later data block selection.

According to another embodiment of this aspect, the at least one indication of reception of the at least one data transmission by the wireless device is a plurality of indications of reception, and the modifying of the maximum channel code rate limit occurs in response to receiving the plurality of indications of reception. According to another embodiment of this aspect, at least one data transmission coded at the modified maximum channel code rate is transmitted to the wireless device. At least one positive indication of reception of the at least one data transmission coded at the modified maximum channel code rate by the wireless device is received. In response to receiving the at least one positive indication of reception associated with the at least one data transmission coded at the modified maximum channel code rate, the modified maximum channel code rate limit is increased.

According to another aspect of the disclosure, a network node for adjusting a maximum channel code rate limit of a wireless device is provided. The network node includes a data transmission module configured to transmit, to the wireless device, at least one data transmission coded at a maximum channel code rate that is one of less than and equal to a maximum channel code rate limit. The network node further includes a reception module configured to receive at least one indication of reception of the at least one data transmission coded at the maximum channel code rate by the wireless device. The network node further includes a rate limit modification module configured to, in response to receiving the at least one indication of reception associated with the at least one data transmission coded at the maximum channel code rate, modify the maximum channel code rate limit.

According to another aspect of the disclosure, a network node is provided. The network node includes processing circuitry including a processor and a memory. The memory contains instructions that, when executed by the processor, configure the processor to receive a wireless device code rate capability of a wireless device, and schedule the wireless device with a code rate that is one of less than and equal to the maximum code rate capability of the wireless device. The code rate capability includes a maximum code rate capability of the wireless device.

According to another embodiment of the disclosure, a method of operation of a network node is provided. A wireless device code rate capability of a wireless device is received, and the wireless device is scheduled with a code rate that is one of less than and equal to the maximum code rate capability of the wireless device. The code rate capability includes a maximum code rate capability of the wireless device.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
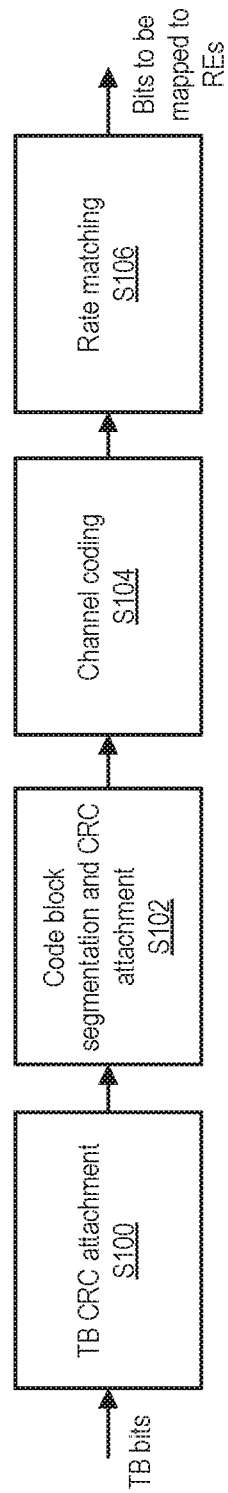
FIG. 1 is a simplified version of an existing physical layer transport block process.

In one or more embodiments, a method, a network node and a system for wireless communication networks for adjusting a wireless device specific maximum code rate limit is provided. In one or more embodiments, the wireless device specific maximum code rate limit adjustment is used for Physical Downlink Shared Channel (PDSCH) link adaptation. In particular, a wireless device is initially assigned a maximum code rate limit, such as 0.931 as specified in section 7.1.7 of 3GPP TS 36.213, which can be adjusted to one or more higher values if at least one attempt to transmit higher code rate transport blocks to a wireless device are determined to have been successful or successfully decoded, i.e., the wireless device is capable of successfully decoding the higher code rate. Further, the teachings of the disclosure provide improved peak rates for wireless devices with better decoding capability. The peak rate improvement comes from at least one of two aspects: one is that the code rate limit such as 0.931 as specified in section 7.1.7 of 3GPP TS 36.213 is modified to a higher rate up to 1.0, and the other is the quantization effect in the TB size selection as a large TB size instead of a table restricted step-down TB size version, which may be with 10-15% less in size in certain scenarios such as when the TB size is large, may be selected more frequently in good channel conditions. This improves peak rate and helps improve the cell throughput as well.

Before describing in detail exemplary embodiments that are in accordance with the disclosure, it is noted that the embodiments reside primarily in combinations of node/ device components and processing steps related to wireless device specific maximum code rate adjustment. Accordingly, components have been represented where appropriate by conventional symbols in drawings, showing only those specific details that are pertinent to understanding the embodiments of the disclosure so as not to obscure the disclosure with details that will be readily apparent to those of ordinary skill in the art having the benefit of the description herein.

As used herein, relational terms, such as "first," "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

Further, although certain embodiments are described using LTE and even particular 3GPP standards, the disclosure is not limited solely to LTE or solely to wireless devices and network nodes that comply with particular 3GPP standards. It is contemplated that the concepts and embodiments of this disclosure can be implemented using other wireless communication arrangements and standards.

Figure 2:
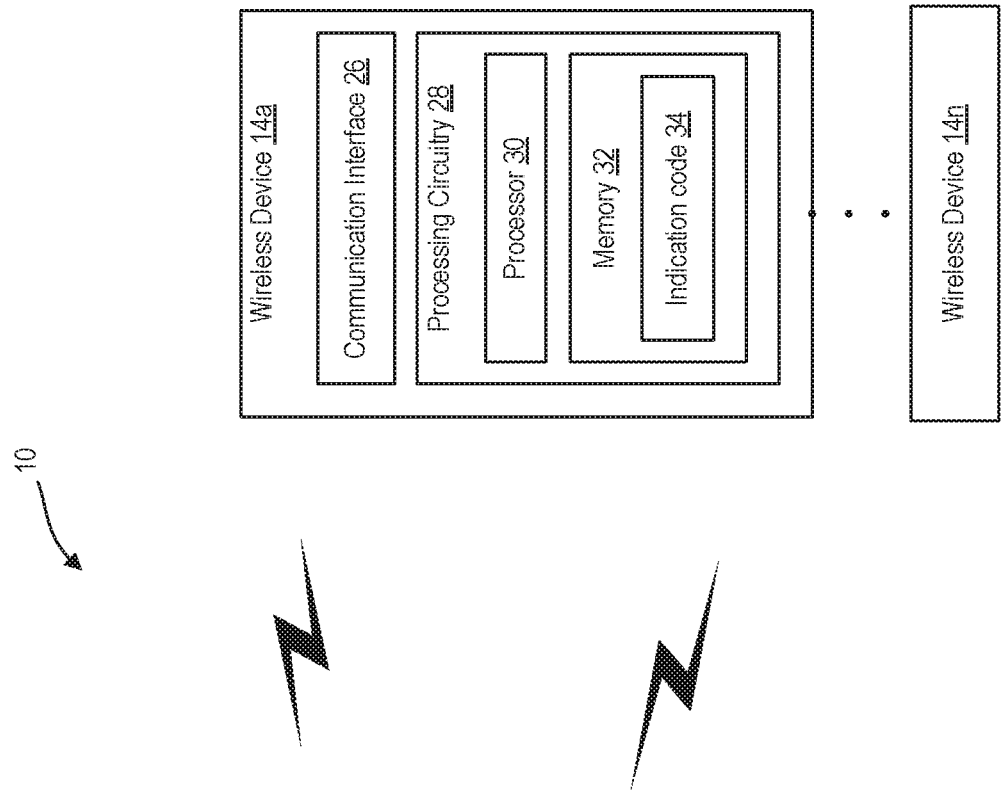
FIG. 2 is a block diagram of an exemplary system for performing maximum code rate limit adjustment for one or more wireless devices in accordance with the principles of the disclosure.
Figure 2:
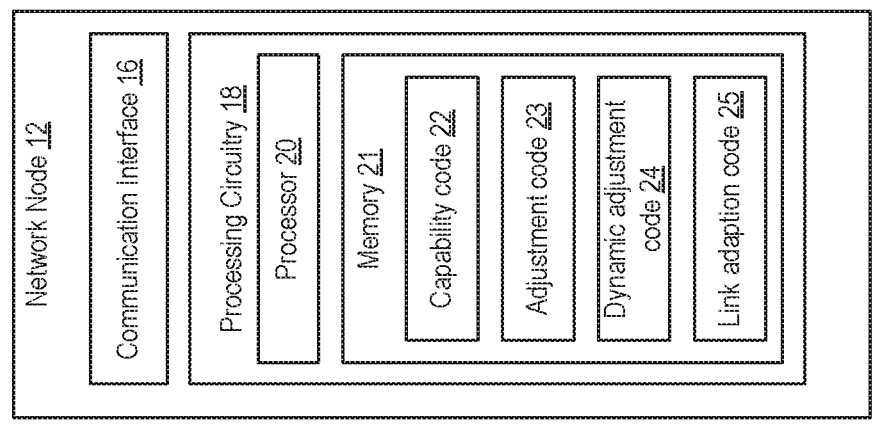

Referring now to drawing figures in which like reference designators refer to like elements there is shown in FIG. 2 an exemplary system for performing maximum code rate limit adjustment for one or more wireless devices in accordance with the principles of the disclosure and designated generally as "10." System 10 includes one or more network nodes 12 and one or more wireless devices 14*a*-14*n* (collectively referred to as wireless device 14) in communication with each other via one or more communication links, paths and/or networks via one or more communication protocols such as Long Term Evolution (LTE) based protocols and/or LTE-Advanced based protocols.

In one or more embodiments, network node 12 is an evolved NodeB (eNB), base station, radio base station, base transceiver station, remote radio unit (RRU), remote radio head (RRH), access point, among other types of nodes known in the art. In one or more embodiments, wireless device 14 is a radio communication device, target device, device-to-device wireless device, user equipment (UE), machine type wireless device or wireless device capable of machine to machine communication, a sensor equipped with wireless device, tablet, mobile terminal, mobile telephone, laptop, computer, appliance, automobile, smart phone, laptop embedded equipped (LEE), laptop mounted equipment (LME), USB dongle and customer premises equipment (CPE), among other devices that can communicate radio or wireless signals as are known in the art.

Network node 12 includes one or more communication interfaces 16 for communicating with wireless devices 14, other network nodes 12 and/or other entities in system 10. In one or more embodiments, communication interface 16 is replaced by one or more transmitters, i.e., transmission circuitry, and one or more receivers, i.e., receiver circuitry, for communicating signals, packets, data, etc.

Network node 12 includes processing circuitry 18. Processing circuitry 18 includes processor 20 and memory 12. In addition to a traditional processor and memory, processing circuitry 18 may comprise integrated circuitry for processing and/or control, e.g., one or more processors and/or processor cores and/or FPGAs (Field Programmable Gate Array) and/or ASICs (Application Specific Integrated Circuitry). Processor 20 may be configured to access (e.g., write to and/or read from) memory 21, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 21 may be configured to store code executable by processor 20 and/or other data, e.g., data pertaining to communication, e.g., configuration and/or address data of nodes, etc. Processing circuitry 18 may be configured to control any of the methods and/or processes described herein and/or to cause such methods and/or processes to be performed, e.g., by network node 12. Corresponding instructions may be stored in the memory 12, which may be readable and/or readably connected to processor 20.

Processor 20 corresponds to one or more processors for performing network node 12 functions described herein. Memory 21 is configured to store data, programmatic software code and/or other information described herein. Memory 21 is configured to store capability code 22. For example, capability code 22 includes instructions that, when executed by processor 20, causes processor 20 to perform the process discussed in detail with respect to FIG. 10. Memory 21 is configured to store adjustment code 23. For example, adjustment code 2 includes instructions that, when executed by processor 20 , causes processor 20 to perform the process discussed in detail with respect to FIGS. 3-4. Memory 21 is configured to store dynamic adjustment code . For example, dynamic adjustment code 24 includes instructions that, when executed by processor 20, causes processor 20 to perform the process discussed in detail with respect to FIG. 5. Memory 21 is configured to store link adaptation code 25. For example, link adaptation code 25 includes instructions that, when executed by processor 20, causes processor 20 to perform the link adaptation process discussed in detail with respect to FIG. 6.

Wireless device 14 includes one or more communication interfaces 26 for communicating with network node 12, other wireless devices 14 and/or other entities in system 10. Wireless device 14 includes processing circuitry 28. Processing circuitry 28 includes processor 30 and memory 32. In addition to a traditional processor and memory, processing circuitry 28 may comprise integrated circuitry for processing and/or control, e.g., one or more processors and/or processor cores and/or FPGAs (Field Programmable Gate Array) and/or ASICs (Application Specific Integrated Circuitry). Processor 30 may be configured to access (e.g., write to and/or read from) memory 32, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory). Such memory 32 may be configured to store code executable by processor 30 and/or other data, e.g., data pertaining to communication, e.g., configuration and/or address data of nodes, etc. Processing circuitry 28 may be configured to control any of the methods and/or processes described herein and/or to cause such methods and/or processes to be performed, e.g., by wireless device 14. Corresponding instructions may be stored in the memory 32, which may be readable and/or readably connected to processor 30.

Processor 30 corresponds to one or more processors for performing wireless device 14 functions described herein. Memory 32 is configured to store data, programmatic software code and/or other information described herein. Memory 32 is configured to store indication code 34. For example, indication code 34 includes instructions that, when executed by processor 30, causes processor 30 to perform the process discussed in detail with respect to FIG. 7.

Figure 3:
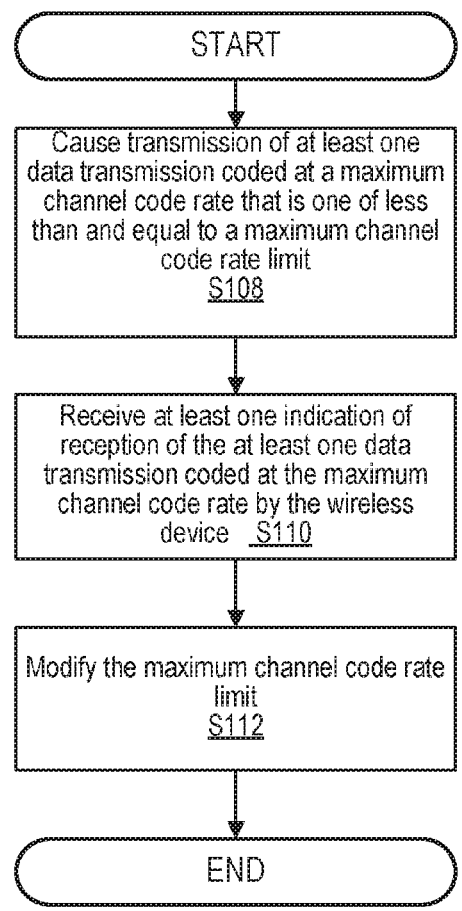
FIG. 3 is a flow diagram of one embodiment of an exemplary adjustment process for adjusting an effective maximum channel code rate of a wireless device in accordance with the principles of the disclosure.

FIG. 3 is a flow diagram of one embodiment of an exemplary adjustment process of adjustment code 2 for adjusting an effective maximum channel code rate limit of wireless device 14 in accordance with the principles of the disclosure. Processing circuitry 18 causes transmission, to wireless device 14, of at least one data transmission coded at a maximum channel code rate that is one of less than and equal to a maximum channel code rate limit (Block S108). In one or more embodiments, the maximum channel code rate limit is defined in an LTE standard such as in section 7.1.7 of 3GPP TS 36.213 v10.9.0. For example, section 7.1.7 of 3GPP TS 36.213 v10.9.0 defines the maximum channel code rate limit to be 0.931. In one or more embodiments, the maximum channel code rate limit is defined by a network operator or other entity. In one or more embodiments, the at least one data transmission coded at the maximum channel code rate is a plurality of data transmission at the maximum channel code rate.

Processing circuitry 18 receives at least one indication of reception of the at least one data transmission coded at the maximum channel code rate by the wireless device (Block S110). For example, in one or more embodiments, wireless device 14 transmits a positive or negative indication of reception of the data transmission that is coded at the maximum channel code rate to network node 12. The positive indication indicates successful receipt of a data transmission received by wireless device 14. In one or more embodiments, the positive indication is a hybrid automatic repeat request (HARQ), positive acknowledgement (ACK). In one or more embodiments, the at least one indication of reception of the at least one data transmission is a predefined number of positive indications of reception of data transmission coded at the maximum channel code rate. For example, the predefined number of positive indications may be defined by a network operator or other entity. In one embodiment, the predefined number of positive indications is a number K1 (discussed below) out of N data transmissions. In other words, a predefined number of positive indications for a sequence of new transmissions indicates wireless device 14 has the capability of decoding transport blocks at the current effective maximum code rate.

A negative indication indicates unsuccessful receipt of a data transmission received by wireless device 14 such as if wireless device 14 determines not to decode the data transmission or is unable to decode the data transmission. In one or more embodiments, the negative indication is a HARQ negative acknowledgement (NACK). In one or more embodiments, the at least one indication of reception of the at least one data transmission is a predefined number of negative indications of reception of the at least one data transmission coded at the maximum channel code rate. For example, the predefined number of negative indications may be defined by a network operator or other entity. In one embodiment, the predefined number of negative indications is a number K2 (discussed below) out of N data transmissions. In other words, a predefined number of negative indications for a sequence of new transmissions indicates wireless device 14 does not have the capability of decoding transport blocks at the current effective maximum code rate. Further, in one or more embodiments, both positive and negative indications are received in response to a plurality of data transmissions at a specific code rate.

In response to receiving at least one indication of reception of the at least one data transmission coded at the maximum channel code rate by wireless device 14, processing circuitry 18 modifies the maximum channel code rate limit (Block S112). For example, in one or more embodiments, processing circuitry 18 increases the maximum channel code rate limit in response to receiving at least one positive indication of reception. In one or more embodiments, the maximum channel code rate limit is increased to a channel code rate greater than maximum channel code rate limit defined in section 7.1.7 of 3GPP TS 36.213 v10.9.0, i.e., greater than 0.931. The increase of the channel code rate for wireless device 14 advantageously improves the peak rate for wireless device 14 as well as cell throughput.

In one or more embodiments, the maximum channel code rate limit of wireless device 14 is increased by a predefined amount or adjustment step size ($\Delta$). For example, in one embodiment, the predefined amount of $\Delta$ is 0.01. However, $\Delta$ is not limited to this value and can be another predefined value that is: set by a network operator/entity, based on historical data, or based on one or more metrics. In one or more embodiments, the maximum channel code rate limit of wireless device 14 is increased based on a quantized transport block, TB, size. In particular, for a given number of radio resources, different quantized TB sizes correspond to different quantized code rates, which may or may not exceed the maximum code rate limit. The quantized code rates less than the maximum code rate limit form a set of quantized code rates for the use of data transmissions. Therefore, selecting an amount to increase or decrease the maximum code rate limit changes the set of quantized code rates for the use of data transmissions such that the maximum code rate is less than or equal to the maximum code rate limit.

In another example, in one or more embodiments, processing circuitry 18 decreases the maximum channel code rate limit in response to receiving at least one negative indication of reception. In one or more embodiments, processing circuitry 18 decreases the maximum code rate limit by a predefined amount or adjustment step size ($\Delta$) as described above. In one or more embodiments, processing circuitry 18 decreases the maximum code rate limit based on a quantized transport block, TB, size as described above. It is noted that the decrease in the maximum code rate limit by a predefined amount or adjustment step size ($\Delta$) needs not be equal to the increase in the maximum code rate limit by a predefined amount or adjustment step size ($\Delta$) described above. In other words the decreased amount of code rate limit need not be symmetric with the increased amount of code rate limit.

Figure 4:
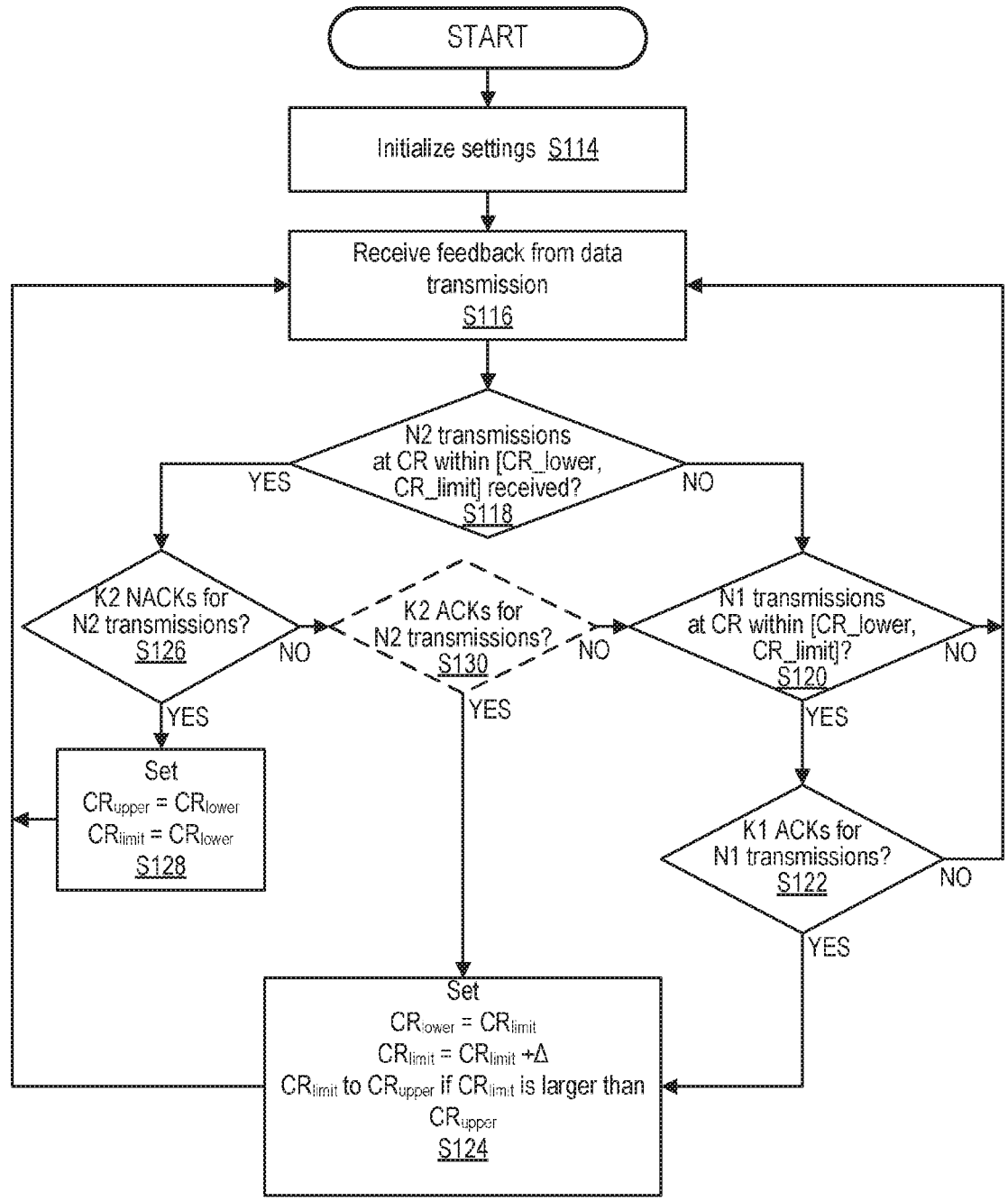
FIG. 4 is a flow diagram of another embodiment of the exemplary adjustment process for adjusting an effective maximum channel code rate of a wireless device in accordance with the principles of the disclosure.

FIG. 4 is a flow diagram of another embodiment of an exemplary adjustment process of adjustment code 2 for adjusting an effective maximum channel code rate limit of wireless device 14 in accordance with the principles of the disclosure. Processing circuitry 18 initializes one or more settings (Block S114). For example, in one or more embodiments, one or more variables and/or criteria are initialized for performing the adjustment process for wireless device 14, i.e., settings are initialized for wireless device 14 session. For example, variables $CR_{limit}$, $CR_{lower}$ and $CR_{upper}$ are initialized, tracked and stored in memory 12, where $CR_{limit}$ represents the maximum code rate limit in use, $CR_{lower}$ is the lower bound for the code rate limit range, and $CR_{upper}$ is the upper bound for the code rate limit range. In one or more embodiments, $CR_{lower}$ and $CR_{limit}$ are initially set to 0.931, while $CR_{upper}$ is initially set to 1.0, i.e., $CR_{lower}$=0.931, $CR_{limit}$=0.931 and $CR_{upper}$=1.0. Further, a predefined adjustment step size ($\Delta$) is set. For example, in one or more embodiments, $\Delta$ is set to 0.01, although other predefined adjustment step sizes or varying adjustment sizes may be used. In one or more embodiments, an assumption is made that the total number of data transmissions (N1) from network node 12 to wireless device 14 for positive acknowledgement evaluation is greater than a total number of data transmissions (N2) from network node 12 to wireless device for negative acknowledgement evaluation, i.e., N1>N2, in which the N1 and N2 transmissions are eventually performed at code rates within [$CR_{lower,limit}$, $CR_{limit}$] for the current $CR_{limit}$, and the $CR_{limit}$ can change during the adjustment process. Here, $CR_{lower,limit}$ is a lower limit used to determine if the maximum code rate is close but no larger than $CR_{limit}$.

In one embodiment, $CR_{lower,limit}$=$CR_{limit}$-$\delta$, where $\delta$ is a small positive value and it can be set equal to $\Delta$=0.01. In another embodiment, $\delta$ is dependent on $CR_{limit}$ such that whenever $CR_{limit}$ changes, $\delta$ is changed accordingly and is set to a value such that $CR_{limit}$-$\delta$ is the maximum code rate for the maximum TB size that can be selected under the condition that the resulting code rate is no larger than $CR_{limit}$. In that case, the aforementioned adjustment step size ($\Delta$) is also dependent on $CR_{limit}$ and can be set equal to $\delta$. In yet another embodiment, $CR_{lower,limit}$ is set to $CR_{lower}$ while $CR_{lower}$ is initialized to $CR_{default}$-$\delta$ with $CR_{default}$=0.931, and later $CR_{lower}$ is set to the previous $CR_{limit}$ whenever there was a code rate limit increase on $CR_{limit}$. In other words, the range [$CR_{lower,limit}$, $CR_{limit}$] becomes [$CR_{lower}$, $CR_{limit}$] to indicate a code rate range between a previously used $CR_{limit}$ and a current $CR_{limit}$.

Processing circuitry 18 receives feedback from at least one data transmission (Block S116). For example, feedback includes positive indications and/or negative indications that are received by network node 12 from wireless device 14 for the data transmissions. In one or more embodiments, the positive indication is a hybrid automatic repeat request (HARQ) positive acknowledgement (ACK), and the negative indication is a HARQ negative acknowledgement (NACK). In one or more other embodiments, other signaling is used for the positive and/or negative indications. Further, in one or more embodiments, the data transmissions are Physical Downlink Shared Chanel (PDSCH) transmissions.

Processing circuitry 18 determines if there have been N2 transmissions at code rates within [$CR_{lower}$, $CR_{limit}$] (Block S118). As used herein, [$CR_{lower}$, $CR_{limit}$] is as denoted as [CR_lower, CR_limit]. For example, in one or more embodiments, the number of N2 transmissions is a number greater than one such that the adjustment process adjusts the current $CR_{limit}$ based on feedback of more than one downlink transmissions. However, the disclosure is not limited to any specific number of N2 transmissions, and the number of N2 transmissions may be set by a network operator/entity or set based on historical network data and/or design need. In one or more embodiments, processing circuitry also determines if $CR_{lower}$<$CR_{limit}$, in which Blocks S126-S128 may be skipped when $CR_{lower}$=$CR_{limit}$ or when $CR_{limit}$<=0.931 as there is no need to decrease the code rate limit in this situation. In this case, $CR_{limit}$ is set to the default 0.931.

If processing circuitry 18 determines there have not occurred N2 transmissions at code rates within [$CR_{lower}$, $CR_{limit}$], processing circuitry 18 determines if there have occurred N1 transmissions at code rates within [$CR_{lower}$, $CR_{limit}$] (Block S120). For example, processing circuitry 18 determines if wireless device 14 has been scheduled for N1 transmissions at a code rate within [$CR_{lower}$, $CR_{limit}$]. In one or more embodiments, the number of N1 transmissions is a number greater than one such that the adjustment process adjusts the current $CR_{limit}$ based on feedback of more than one data transmission from network node 12 to wireless device 14. However, the disclosure is not limited to any specific number of N1 transmissions, and the number of N1 transmissions may be set by a network operator/entity or set based on historical network data and/or design need. In one or more embodiments, processing circuitry 18 further determines if $CR_{limit}$<$CR_{upper}$ as the code rate will not be increased when $CR_{limit}$ equals $CR_{upper}$.

If processing circuitry 18 determines that there have not occurred N1 transmissions at code rates within [$CR_{lower}$, $CR_{limit}$], processing circuitry 18 performs the process of Block S116. If processing circuitry 18 determines that there have occurred N1 transmissions at code rates within [$CR_{lower}$, $CR_{limit}$], processing circuitry 18 determines if K1 ACKs have been received by network node 12 for N1 transmissions from network node 12 to wireless device 14 (Block S122). In one or more embodiments, K1 is a positive integer corresponding to a number of ACKs. In other words, network node 12 receiving a number of K1 ACKs from wireless device 14 for N1 transmissions to wireless device 14 indicates that wireless device 14 is capable of decoding downlink data transmission at code rates within [$CR_{lower}$, $CR_{limit}$] such that the $CR_{limit}$ can be increased as discussed below. The disclosure is not limited to any specific number of K1 ACKs, and the number of K1 ACKs may be set by a network operator/entity or set based on historical network data and/or design need.

If processing circuitry 18 determines that K1 ACKs for N1 transmissions has not been received, processing circuitry 18 performs the determination of Block S116 such as to continue to receive feedback. If processing circuitry 18 determines that K1 ACKs for N1 transmissions have been received, processing circuitry 18 adjusts one or more settings for wireless device 14 attempting a higher code rate limit such as setting $CR_{lower}=CR_{limit}$ to represent the previously used $CR_{limit}$, $CR_{limit}=CR_{limit}+\Delta$ for a higher $CR_{limit}$, and set $CR_{limit}$ to $CR_{upper}$ if $CR_{limit}$ is larger than $CR_{upper}$ so as to limit $CR_{limit}$ not to exceed the upper bound (Block S124). In other words, one or more of the settings for wireless device 14 are adjusted such that data transmissions to wireless device 14 occur at an increased channel code rate, i.e., at $CR_{limit}=CR_{limit}+\Delta$, thereby increasing the channel code rate limit for wireless device 14 above the specified maximum channel code rate to advantageously improve the peak rate for wireless device 14 and cell throughput.

Referring back to Block S118, if processing circuitry 18 determines N2 transmissions have not occurred at code rates within [$CR_{lower}$, $CR_{limit}$], processing circuitry 18 determines if K2 NACKs for N2 transmissions at code rate close to but no larger than the current $CR_{limit}$ has been received (Block S126). In one or more embodiments, K2 is a positive integer corresponding to a number of number of NACKs. For example, the reception of K2 NACKs indicates that wireless device 14 did not or was not able to decode the downlink transmissions at the maximum code rate close to but no larger than $CR_{limit}$ for K2 instances. The disclosure is not limited to any specific number of K2 NACKs, and the number of K2 NACKs may be set by a network operator/entity or set based on historical network data and/or design need.

If processing circuitry 18 determines K2 NACKs for N2 transmissions at code rates within [$CR_{lower}$, $CR_{limit}$] have been received, processing circuitry 18 adjusts one or more parameters to reduce $CR_{limit}$ back to $CR_{lower}$ as transmissions at code rates [$CR_{lower}$, $CR_{limit}$] cannot be successfully decoded by wireless device 14 (Block S128). In one or more embodiments, the adjustment of Block S128 includes setting $CR_{upper}=CR_{limit}$ and $CR_{limit}=CR_{lower}$. In particular, setting $CR_{upper}=CR_{lower}$ provides a new upper code rate limit equal to the code rate limit previously used as any code rate beyond that results in NACKs such that the code rate should not climb beyond that point again for the current wireless device 14 session. Also, setting $CR_{limit}=CR_{lower}$ sets $CR_{limit}$ to a previous code rate limit such as a previous code rate limit of $CR_{limit}=CR_{limit}-\Delta$ or $CR_{limit}=0.931$. In other words, if the previous or recent "up" adjustment on the maximum code rate limit was not successful as indicated by K2 NACKs, wireless device 14 is reverted back to the previous maximum code rate limit.

If processing circuitry 18 determines K2 NACKs for N2 transmissions at code rates within [$CR_{lower}$, $CR_{limit}$] have not been received, processing circuitry 18 determines if K2 ACKs for N2 transmissions at code rates within [$CR_{lower}$, $CR_{limit}$] have been received (Block S130). For example, receipt of K2 ACKs at network node 12 from wireless device 14 indicates that wireless device 14 was able to decode the downlink transmissions at code rates beyond $CR_{lower}$ for K2 instances. If $CR_{lower}$ is larger than an originally specified maximum channel code rate limit such as 0.931, it suggests that wireless device 14 is capable of operating at a code rate higher than the originally specified maximum channel code rate limit such as 0.931.

If processing circuitry 18 determines K2 ACKs for N2 transmissions at code rates within [$CR_{lower}$, $CR_{limit}$] have been received, processing circuitry 18 performs Block S124 such that one or more of the settings for wireless device 14 are adjusted such that data transmissions to wireless device 14 occur at codes rates at an increased channel code rate limit, i.e., at $CR_{limit}=CR_{limit}+\Delta$, thereby increasing the channel code rate for wireless device 14 above the specified maximum channel code rate to advantageously improve the peak rate for wireless device 14 and cell throughput. If processing circuitry 18 determines K2 ACKs for N2 transmissions at code rates beyond $CR_{lower}$ have not been received, processing circuitry 28 performs the determination of Block S120. In one or more embodiments, Block S130 is omitted based on design choice.

Figure 5:
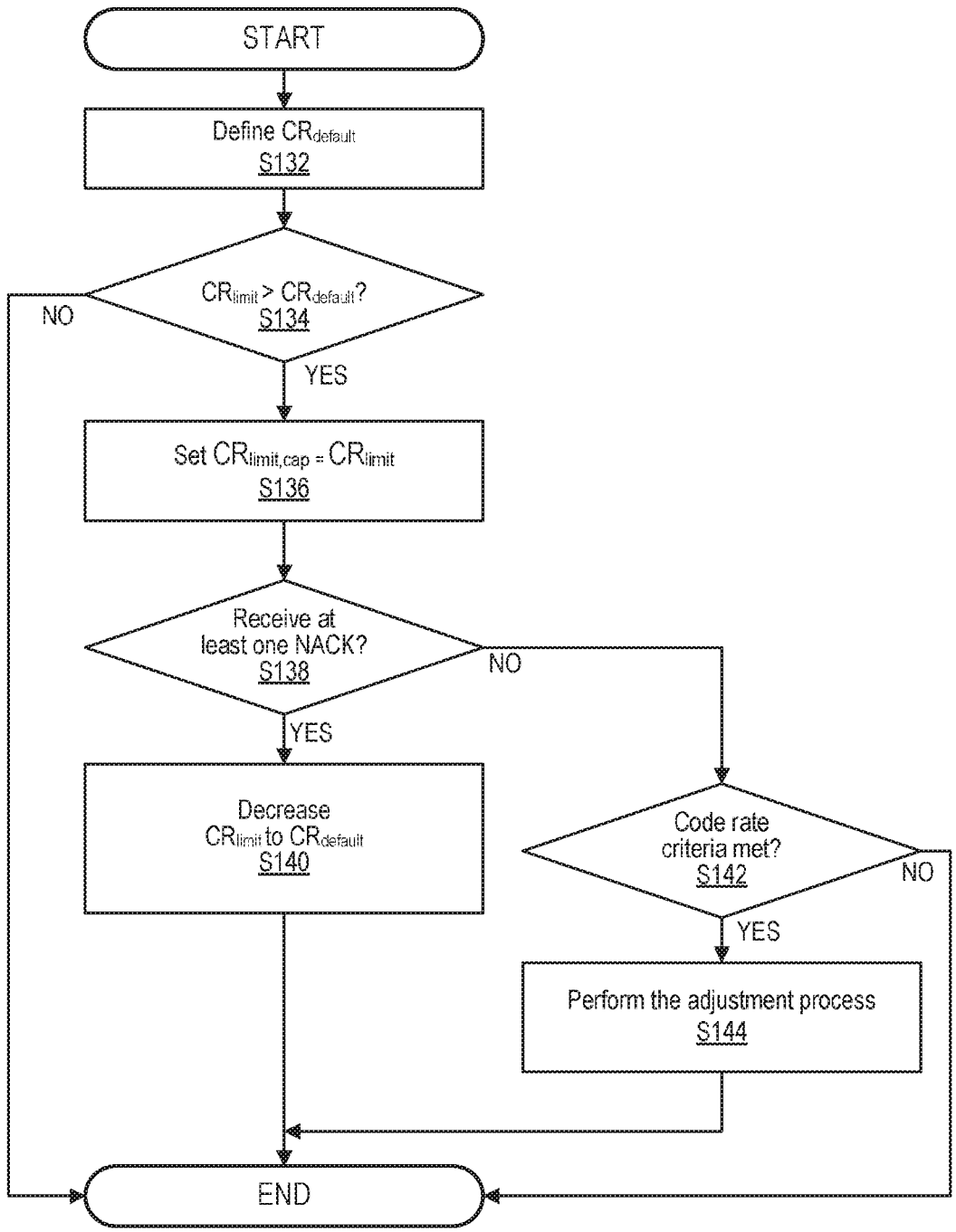
FIG. 5 is a flow diagram of an exemplary dynamic maximum code rate limit determination process for adjusting an effective maximum channel code rate of a wireless device in accordance with the principles of the disclosure.

FIG. 5 is a flow diagram of an exemplary dynamic maximum code rate limit determination process of dynamic adjustment code 24 for adjusting an effective maximum channel code rate limit of wireless device 14 in accordance with the principles of the disclosure. In one or more embodiments, the maximum code rate limit of wireless device 14 changes based on one or more factors or situations. For example, wireless device 14 is operating on its battery power in mobility such that wireless device 14 may skip an initial transmission if the maximum code rate limit is exceed. However, when wireless device 14 is plugged into a power supply, e.g., power outlet, wireless device 14 may try decoding any initial transmission, thereby allowing network node 12 to increase the effective channel coding rate limit of device 14 as described in FIGS. 3-4. In other words, the maximum code rate limit of wireless device 14 may change over time. In some instances, this change is infrequent such that the adjustment process of adjustment code 23 is configured to be invoked regularly, periodically or as needed, or invoked by the dynamic maximum code rate limit determination process.

Processing circuitry 18 defines $CR_{default}$ (Block S132). For example, in one or more embodiments $CR_{default}$ is defined to correspond to a default maximum code rate limit such as the maximum code rate limit defined section 7.1.7 of 3GPP TS 36.213 v10.9.0, namely, 0.931. Processing circuitry 18 determines if $CR_{limit}$ is greater than $CR_{default}$ (Block S134). For example, in one or more embodiments, processing circuitry 18 determines if a resultant $CR_{limit}$ from the adjustment process of FIGS. 3-4 is greater than $CR_{default}$. If processing circuitry 18 determines $CR_{limit}$ is not greater than $CR_{default}$, the dynamic maximum code rate limit determination process ends, or selects another wireless device 14 for dynamic maximum code rate limit determination.

If processing circuitry 18 determines $CR_{limit}$ is greater than $CR_{default}$, processing circuitry sets $CR_{limit,cap}=CR_{limit}$ (Block S136). Processing circuitry 18 determines if at least one NACK or negative acknowledgement has been received from wireless device 14 (Block S138). For example, in one or more embodiments, processing circuitry 18 determines if a plurality of NACKs for transmissions with a code rate greater than $CR_{default}$ has been received. The receipt of at least one NACK or a plurality of NACKS indicates that network node 14 should change the maximum code rate limit of wireless device 14 as wireless device 14 is not able to decode the transmission. If processing circuitry 18 determines at least one NACK has been received, processing circuitry 18 decreases $CR_{limit}$ to $CR_{default}$ (Block S140). In one example, wireless device 14 may have been using a higher effective channel code rate than $CR_{default}$ while wireless device 14 was not operating off battery power, e.g., while plugged into a power outlet, but wireless device 14 has since moved operating using battery power. Therefore, wireless device 14 may no longer be configured to use an effective channel code rate greater than $CR_{default}$, hence, processing circuitry 18 decreases $CR_{limit}$ to $CR_{default}$. The disclosure is not limited to this situation, and wireless device 14 may change its maximum code rate limit for various reason and/or in various scenarios in which network node 12 will detect the change in code rate limit of wireless device 14 based on the dynamic maximum code rate limit determination process.

Referring back to Block S138, if processing circuitry 18 determines at least one NACK or negative indication has not been received, processing circuitry 18 determines if code rate criteria is met (Block S142). For example, in one or more embodiments, a code rate criteria is defined as $CR_{limit,cap} > CR_{default}$ and $CR_{limit,cap} > CR_{limit}$. In this example, the code rate criteria is met if $CR_{limit,cap}$ is greater than $CR_{default}$ and $CR_{limit,cap}$ is greater than $CR_{limit}$. The code rate criteria is not limited to this example and may include different variables, inequalities and/or logical functions. If processing circuitry 18 determines the code rate criteria is not met, the dynamic maximum code rate limit determination process ends or processing circuitry 18 selects another wireless device 14 for the dynamic maximum code rate limit determination process. If processing circuitry 18 determines the code rate criteria is met, processing circuitry 18 performs the adjustment process of adjustment code 23 (Block S144). In other words, in this situation, processing circuitry 18 determines that wireless device 14 was previously capable of decoding at a code rate limit up to $CR_{limit,cap}$, but wireless device 14's code rate limit has later been adjusted down. Therefore, network node 14 attempts to increase the maximum code rate limit again by performing the adjustment process of adjustment code 23.

Figure 6:
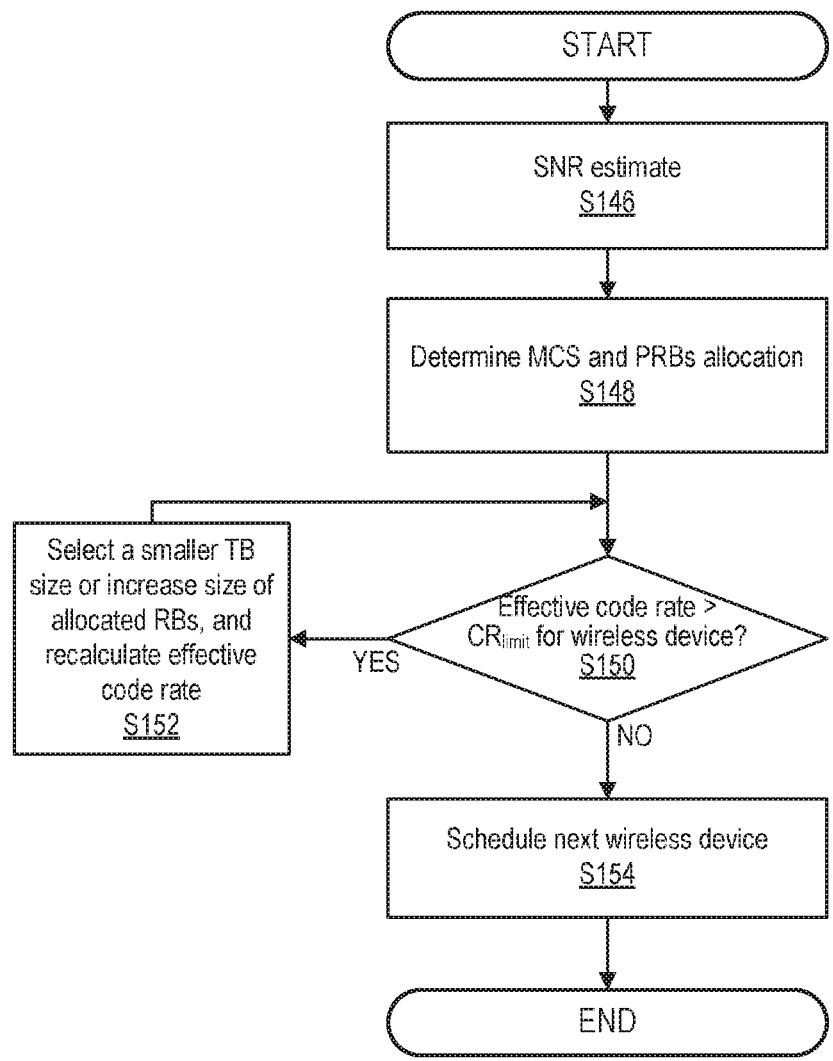
FIG. 6 is a flow diagram of an exemplary link adaption process using the modified maximum channel code rate in accordance with the principles of the disclosure.

FIG. 6 is a flow diagram of an exemplary link adaption process of link adaptation code 25 using the modified $CR_{limit}$ or maximum channel code rate limit in accordance with the principles of the disclosure. In particular, in each sub-frame, network node 12 will check the wireless device 14's request and schedule for the selected wireless device 14. Network node 12 selects wireless device 14(i) for scheduling. Processing circuitry 18 determines a signal-to-noise ratio (SNR) (Block S146). For example, in one or more embodiments, the SNR estimate as a downlink channel quality measurement is determined or updated. Processing circuitry 18 determines a modulation and coding scheme (MCS), transport block size and resource allocation based at least in part on the SNR estimate (Block S148).

Processing circuitry 18 determines if an effective code rate is greater than $CR_{limit}$ for wireless device 14 (Block S150). For example, in one or more embodiments, processing circuitry 18 determines if an effective code rate of the MCS and PRB allocation is greater than $CR_{limit}$ that was determined for wireless device 14 in the process of FIGS. 3-4. If processing circuitry 18 determines the effective code rate is greater than $CR_{limit}$, processing circuitry 18 selects a smaller transport block (TB) size or increases a size of the allocation PRBs, and recalculates the effective code rate (Block S152). For example, in one or more embodiments, processing circuitry 18 may either increase the number of PRBs assigned, or reduce the TBS size until the obtained effective code rate is smaller than or equal to wireless device 14's specific code rate limit. In other words, the TBS size is adjusted by what is needed to achieve an allowable code rate, thereby allowing a smaller adjustment to the TBS size than the larger predefined TB size steps/adjustments defined in 3GPP TS 36.213 v10.9.0. Using wireless device 14's specific code rate limit adjustment from FIG. 4, wireless devices 14 having better decoding capability will have a code rate limit larger than the specified maximum channel code rate, e.g., 0.931, resulting in an improved downlink throughput when higher transport block sizes being selected for transmission. In a handover situation, in one or more embodiments, the maximum code rate limit for a given wireless device 14 session in a source cell may be transferred to a target cell when wireless device 14 is handed over to the target cell so that there is no need to trigger the maximum code rate limit determination procedure again on the target cell.

If processing circuitry 18 determines that the effective code rate is not greater than $CR_{limit}$, processing circuitry 18 schedules wireless device 14 at the effective code rate and schedules a next wireless device 14 using the same process of FIG. 6 (Block S154). For example, in one or more embodiments, if the effective code rate is larger than (or equal to) 0.931 but smaller than (or equal to) wireless device 14's specific code rate limit, the MCS index of 28 (with corresponding TB size) as defined in 3GPP TS36.213 is used.

Figure 7:
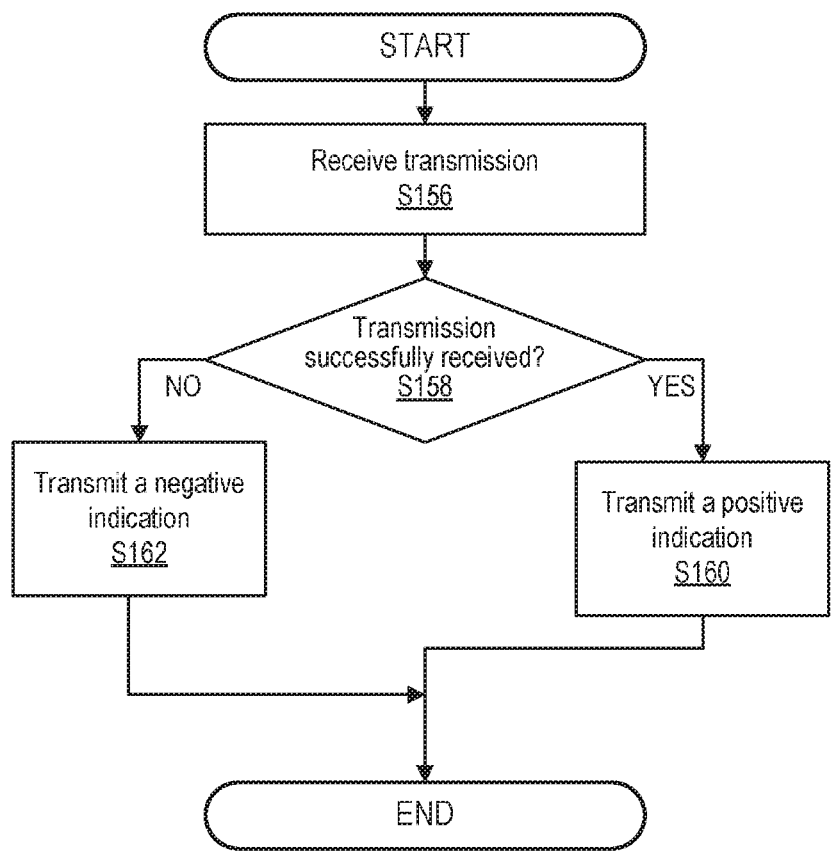
FIG. 7 is a flow diagram of an exemplary indication process in accordance with the principles of the disclosure.

FIG. 7 is a flow diagram of an exemplary indication process of indication code 34 in accordance with the principles of the disclosure. Processing circuitry 28 receives a transmission via communication interface 26 (Block S156). For example, in one or more embodiments, processing circuitry 28 receives a PDSCH transmission. Processing circuitry 28 determines whether the transmission was successfully received (Block S158). For example, in one or more embodiments, processing circuitry 28 determines whether the transport block of the transmission was successfully decoded. If processing circuitry 28 determines the transmission was successfully received, processing circuitry 28 transmits a positive indication, e.g., ACK (Block S160). If processing circuitry 28 determines the transmission was not successfully received, processing circuitry 28 transmits a negative indication, e.g., NACK (Block S162). The feedback, i.e., negative and/or positive indications, is used by network node 12 in adjusting the effective maximum channel code rate limit of wireless device 14 as discussed in FIGS. 3-5. Thereby, providing improved peak rates for wireless device 14 and, in some instances, higher cell throughput.

Figure 8:
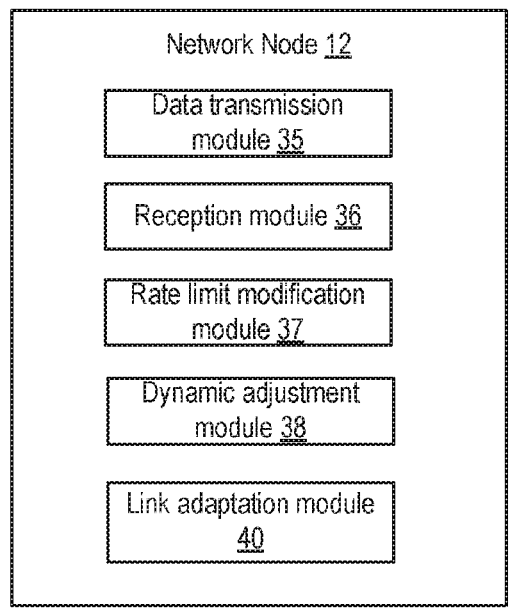
FIG. 8 is a block diagram of another exemplary network node in accordance with the principles of the disclosure.
Figure 9:
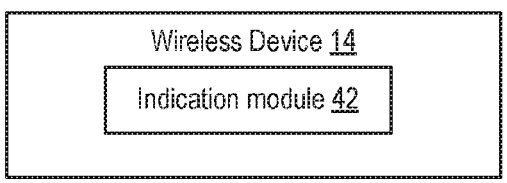
FIG. 9 is a block diagram of another exemplary wireless device in accordance with the principles of the disclosure.

FIG. 8 is a block diagram of another exemplary network node 12. Network node 12 includes data transmission module 35 configured to transmit, to the wireless device 14, at least one data transmission coded at a maximum channel code rate that is one of less than and equal to a maximum channel code rate limit. Network node 12 further includes reception module 36 configured to receive at least one indication of reception of the at least one data transmission coded at the maximum channel code rate by the wireless device 14. Network node 12 further includes rate limit modification module 37 configured to, in response to receiving the at least one indication of reception associated with the at least one data transmission coded at the maximum channel code rate, modify the maximum channel code rate limit. Network node 12 includes dynamic adjustment module 38 that is configured to perform the dynamic maximum code rate limit determination process described above with respect to FIG. 5. Network node 12 includes link adaptation module 40 that is configured to perform the link adaption process of FIG. 6. FIG. 9 is a block diagram of another exemplary wireless device 14. Wireless device 14 includes indication module 42 that is configured to perform the indication process of FIG. 7.

EXAMPLES

The following examples demonstrate one or more advantages of the wireless device code rate limit adjustment described in this disclosure. Table 1 (illustrated below) illustrates effective code rates for one wireless device 14 in sub-frame 0, 1, and 5 in an LTE Frequency Division Duplex (FDD) system with 20 MHz and 2 transmit (Tx) antennas with one layer PDSCH transmission.

TABLE 1

Effective code rates for wireless device 14 in sub-frame 0, 1, and 5 in an LTE FDD system with 20 MHz and 2Tx antennas

| Number of Antennas | 2Tx | 2Tx | 2Tx | Notes |
|---|---|---|---|---|
| nPDCCH | 1 | 1 | 1 | One OFDM symbol for PDCCH transmission. |
| Subframe | 0 | 1 | 5 | Subframe 0 and 1 as examples. |
| nRBs | 100 | 100 | 100 | 20 MHz channel bandwidth for nRBs = 100. |
| total nREs | 15600 | 15600 | 15600 | =12 * nRBs * (14 − nPDCCH) |
| PBCH | 240 | 0 | 0 | PBCH presence in subframe 0. |
| CRS nREs | 1200 | 1200 | 1200 | 2Tx: 4REs/symbol * 3 symbols * 100RBs |
| Sync nREs | 144 | 0 | 144 | Number of REs for synchronization signals in subframe 0 and 5. |
| PDSCH nREs | 14016 | 14400 | 14256 | =total nREs − PBCH nREs − Pilot nREs − Sync nREs |
| PDSCH nBits | 84096 | 86400 | 85536 | =PDSCH nREs * 6 bits/RE |
| TB size | 75376 | 75376 | 75376 | $I_{TBS} = 26$ selected for MCS = 28 and nRBs = 100. |
| CRC_Len | 24 | 24 | 24 | Number of CRC bits attached for each code block. |
| nCodeBlocks | 13 | 13 | 13 | Calculated based on TB size and the maximum code block size of 6144 |
| CRC overhead | 336 | 336 | 336 | =CRC_Len * (nCodeBlocks + 1) |
| Effective code rate | 0.900 | 0.876 | 0.885 | =(TB size + CRC overhead)/PDSCH nBits |

The assumptions in the examples are:
There are 14 OFDM symbols per sub-frame and one OFDM symbol is used for PDCCH transmission.
20 MHz channel bandwidth provides a total of 100 scheduling blocks which can be assigned to one or more wireless devices, wireless device 14 is allocated with all 100 scheduling blocks.
The LTE broadcast channel Physical Broadcast Channel (PBCH) is present in sub-frame 0 and it consumes 240 REs.
The numbers of REs taken by cell-specific reference signal (CRS) and synchronization signals are calculated based on 3GPP LTE standards as are known in the art.

Channel conditions where the MCS is highest are considered, MCS 28, can be used (the corresponding $I_{TBS}$ is 26 from Table 7.1.7.1-1 of 3GPP TS26.213 v10.9.0. The largest transport block size is 75376 bits corresponding to $I_{TBS}$ 26 when all 100 scheduling blocks are selected (from Table 7.1.7.2.1-1 of 3GPP TS36.213 v10.9.0).

The resulting effective code rate is calculated based on the selected transport block size, the corresponding CRC overhead, and the number of raw PDSCH bits available for transmission.

In this example, the effective code rates at the bottom of Table 1 in sub-frame 0, 1, and 5 are less than the default code rate of 0.931, i.e., 0.900, 0.876 and 0.855. This indicates that the selected MCS, MCS 28, and the selected TB size can be used in this case. In Table 2 (illustrated below), the effective code rates for the same scenario as Table 1 are illustrated except the number of antennas are different.

TABLE 2

Effective code rates for wireless device 14 in subframe 0, 1, and 5 in an LTE FDD system with 20 MHz and 4Tx antennas

| Number of Antennas | 4Tx | 4Tx | 4Tx | Notes |
|---|---|---|---|---|
| nPDCCH | 1 | 1 | 1 | One OFDM symbol for PDCCH transmission. |
| Subframe | 0 | 1 | 5 | Subframe 0 and 1 as examples. |
| nRBs | 100 | 100 | 100 | 20 MHz channel bandwidth for nRBs = 100. |
| total nREs | 15600 | 15600 | 15600 | =12 * nRBs * (14 − nPDCCH) |
| PBCH | 240 | 0 | 0 | PBCH presence in subframe 0. |
| CRS nREs | 2000 | 2000 | 2000 | 2Tx: 4REs/symbol * 3 symbols * 100RBs |
| Sync nREs | 144 | 0 | 144 | Number of REs for synchronization signals in subframe 0 and 5. |
| PDSCH nREs | 13216 | 13600 | 13456 | =total nREs − PBCH nREs − Pilot nREs − Sync nREs |
| PDSCH nBits | 79296 | 81600 | 80736 | =PDSCH nREs * 6 bits/RE |
| TB size | 75376 | 75376 | 75376 | $I_{TBS}$ = 26 selected for MCS = 28 and nRBs = 100. |

TABLE 2-continued

Effective code rates for wireless device 14 in subframe 0,
1, and 5 in an LTE FDD system with 20 MHz and 4Tx antennas

| Number of Antennas | 4Tx | 4Tx | 4Tx | Notes |
|---|---|---|---|---|
| CRC_Len | 24 | 24 | 24 | Number of CRC bits attached for each code block. |
| nCodeBlocks | 13 | 13 | 13 | Calculated based on TB size and the maximum code block size of 6144. |
| CRC overhead | 336 | 336 | 336 | =CRC_Len * (nCodeBlocks + 1) |
| Effective code rate | 0.955 | 0.928 | 0.938 | For 4Tx in subframe 0, a step-down version of $I_{TBS}$ = 25 but with the same number of nRBs = 100. The corresponding TB size = 63776 (from Table 7.1.7.2.1-1 of TS36.213) but with code rate = 0.809. Alternatively, TB size = 71112 for $I_{TBS}$ = 26 is selected but with nRBs = 97. In this case, PDSCH nBits needs to be recalculated to determine the code rate |

The number of antennas considered in Table 2 is four and the number of layers for PDSCH transmission is still one for one codeword. Because of four Tx antennas, additional REs are taken by cell-specific reference signals, leaving a smaller number of PDSCH REs in Table 2 as compared with those in Table 1 for the two Tx antenna case. The resulting effective code rates for sub-frame 0 and 5 are now larger than 0.931 as illustrated at the bottom of Table 2, i.e., 0.955 and 0.938.

Without the wireless device code rate limit adjustment and/or link adaptation process described herein, a network node will reduce the code rate and select a smaller transport block size in sub-frame 0 and 5 even though the code rate for sub-frame 5, for example, was initially 0.933 and just slightly above the LTE maximum code rate of 0.931. From Table 7.1.7.2.1-1 of 3GPP TS36.213 v10.9.0, the smaller TB size for $I_{TBS}$=25 (one level down from $I_{TBS}$=26) and when using 100 scheduling blocks is 63776, which is a 15% drop from the largest transport block size of 75376 bits. That means even if wireless device 14 can handle a high effective code rate, the network node in this example will be conservative and its scheduling algorithm will select a transport block size of 63776 bits, resulting in a 15% size drop. With the maximum channel code rate limit adjustment and/or link adaptation described herein, this big size drop may be avoided for wireless devices 14 that are determined to be capable of decoding effective code rate larger than the LTE maximum code rate of 0.931.

Alternatively, in one or more embodiments, network node 12 keeps the same level of $I_{TBS}$=26 but uses a smaller number of scheduling blocks. In that case, the selected transport block size may be larger than 63776 bits for the stepdown version of $I_{TBS}$=25. However, keeping the same $I_{TBS}$=26 but reducing the number of scheduling blocks will need more calculations as a change on the number of scheduling blocks means a change on the number of REs, resulting in a change on the number of physical bits, known as NPHY bits in Equation (3). In other words, the alternative approach needs to recalculate $N_{PHY}$ bits in addition to recalculating the payload plus CRC bits as shown in Equation (4), while using a smaller $I_{TBS}$ but the same number of scheduling blocks needs to recalculate the payload plus CRC bits as shown in Equation (4). The calculation of $N_{PHY}$ in Equation (3) may appear simple but the number of REs depends on the source allocation, and the calculation of $N_{PHY}$ may involve more processing. This alternative approach can be used in order to select a relatively larger transport block size than the TB size selected based on a smaller $I_{TBS}$ approach but the former needs a more complex processing.

Code Rate Limit Capability Signaled by Wireless Devices 14

Figure 10:
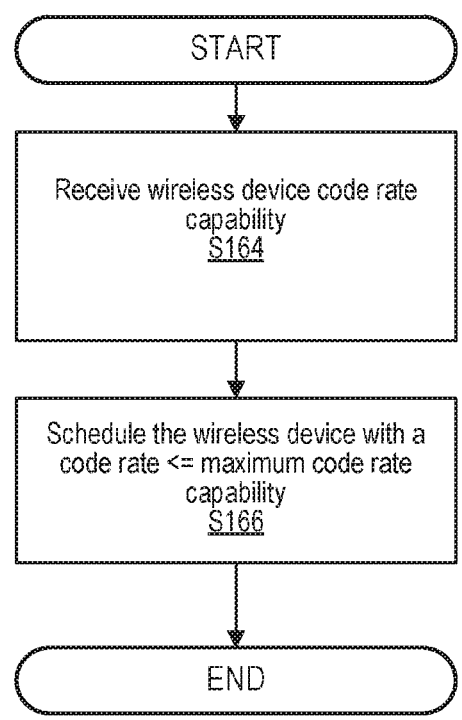
FIG. 10 is a flow diagram of an exemplary capability process in accordance with the principles of the disclosure.

In one or more embodiments, wireless devices 14 with better decoding capability indicate their maximum code rate limit. In particular, FIG. 10 illustrates an exemplary capability process of capability code 22. Processing circuitry 18 receives wireless device code rate capability of wireless device 14 such as a maximum code rate capability for a certain type of traffic (Block S164). In one or more embodiments, wireless device 14 code rate capability includes a plurality of capabilities of wireless device 14 category. In one or more embodiments, the wireless device 14 code rate capability is included as part of a device category signaling that is signaled from wireless device 14 to network node 12. In each wireless device 14 category, one or more wireless devices 14 capabilities such as maximum data rate capability, modulation order capability, coding rate capability, system bandwidth support capability, MIMO capability, CA capability could be specified. For the sake of simplicity, the indication could be one bit to indicate wireless device 14 can support a code rate up to 1.0.

Processing circuitry 18 schedules wireless device 14 with a code rate <=maximum code rate capability, i.e., code rate is less than or equal to the maximum code rate capability, such as for the certain type of traffic (Block S166). For those wireless devices 14, network node 12 does not need to perform the adjustment process and dynamic maximum code rate limit determination process described herein as network node 14 already knows the decoding capability from the indication bit.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby form a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A network node for adjusting a maximum channel code rate limit of a wireless device, the network node comprising:
   processing circuitry, the processing circuitry including a processor and a memory, the memory containing instructions that, when executed by the processor, configure the processor to:
   cause transmission, to the wireless device, of at least one data transmission coded at a maximum channel code rate that is one of less than and equal to a maximum channel code rate limit;
   receive at least one indication of reception of the at least one data transmission coded at the maximum channel code rate by the wireless device; and
   in response to receiving the at least one indication of reception associated with the at least one data transmission coded at the maximum channel code rate, modify the maximum channel code rate limit.

2. The network node of claim 1, wherein the at least one indication of reception of the at least one data transmission by the wireless device is at least one positive indication of reception.

3. The network node of claim 2, wherein the at least one positive indication of reception is at least one hybrid automatic repeat request, HARQ, positive acknowledgement, ACK.

4. The network node of claim 1, wherein the modifying of the maximum channel code rate limit includes:
   if the indication of reception of the at least one data transmission by the wireless device is at least one positive indication, increasing the maximum channel code rate limit of the wireless device by an amount.

5. The network node of claim 4, wherein the increase of the maximum channel code rate limit of the wireless device by the amount occurs if the maximum channel code rate limit of the wireless device plus the amount is less than a maximum level on the maximum channel code rate limit.

6. The network node of claim 4, wherein the amount is a predetermined amount for the increase of the maximum channel code rate limit.

7. The network node of claim 4, wherein the amount for the increase of the maximum channel code rate limit is an amount where the modified maximum channel rate limit is reached in a later data block selection.

8. The network node of claim 1, wherein the indication of reception of the at least one data transmission by the wireless device is at least one negative indication of reception.

9. The network node of claim 8, wherein the at least one negative indication of reception is a hybrid automatic repeat request, HARQ, negative acknowledgment, NACK.

10. The network node of claim 1, wherein the modifying of the maximum channel code rate limit includes:

if the indication of reception of the at least one data transmission by the wireless device is at least one negative indication, decreasing the maximum channel code rate limit of the wireless device by an amount.

11. The network node of claim 10, wherein the decrease of the maximum channel code rate limit of the wireless device by the amount occurs if the maximum channel code rate limit of the wireless device minus the amount is one of greater than or equal to a minimum level on the maximum channel code rate limit.

12. The network node of claim 10, wherein the amount is a predetermined amount for the decrease of the maximum channel code rate limit.

13. The network node of claim 10, wherein the amount for the decrease of the maximum channel code rate limit is an amount where the modified maximum channel rate limit is reached in a later data block selection.

14. The network node of claim 1, wherein the at least one indication of reception of the at least one data transmission by the wireless device is a plurality of indications of reception; and
the modifying of the maximum channel code rate limit occurs in response to receiving the plurality of indications of reception.

15. The network node of claim 1, wherein the memory contains further instructions that, when executed by the processor, configure the processor to:
transmit, to the wireless device, at least one data transmission coded at the modified maximum channel code rate;
receive at least one positive indication of reception of the at least one data transmission coded at the modified maximum channel code rate by the wireless device; and
in response to receiving the at least one positive indication of reception associated with the at least one data transmission coded at the modified maximum channel code rate, increase the modified maximum channel code rate limit.

16. A method of operation of a network node for adjusting a maximum channel code rate limit of a wireless device, the method comprising:
transmitting, to the wireless device, at least one data transmission coded at a maximum channel code rate that is one of less than and equal to a maximum channel code rate limit;
receiving at least one indication of reception of the at least one data transmission coded at the maximum channel code rate by the wireless device; and
in response to receiving the at least one indication of reception associated with the at least one data transmission coded at the maximum channel code rate, modifying the maximum channel code rate limit.

17. The method of claim 16, wherein the at least one indication of reception of the at least one data transmission by the wireless device is at least one positive indication of reception.

18. The method of claim 17, wherein the at least one positive indication of reception is at least one hybrid automatic repeat request, HARQ, positive acknowledgement, ACK.

19. The method of claim 16, wherein the modifying of the maximum channel code rate limit includes:
if the indication of reception of the at least one data transmission by the wireless device is at least one positive indication, increasing the maximum channel code rate limit of the wireless device by an amount.

20. The method of claim 19, wherein the increase of the maximum channel code rate limit of the wireless device by the amount occurs if the maximum channel code rate limit of the wireless device plus the amount is less than a maximum level on the maximum channel code rate limit.

21. The method of claim 19, wherein the amount is a predetermined amount for the increase of the maximum channel code rate limit.

22. The method of claim 19, wherein the amount for the increase of the maximum channel code rate limit is an amount where the modified maximum channel rate limit is reached in a later data block selection.

23. The method of claim 16, wherein the indication of reception of the at least one data transmission by the wireless device is at least one negative indication of reception.

24. The method of claim 23, wherein the at least one negative indication of reception is a hybrid automatic repeat request, HARQ, negative acknowledgment, NACK.

25. The method of claim 16, wherein the modifying of the maximum channel code rate limit includes:
if the indication of reception of the at least one data transmission by the wireless device is at least one negative indication, decreasing the maximum channel code rate limit of the wireless device by an amount.

26. The method of claim 25, wherein the decrease of the maximum channel code rate limit of the wireless device by the amount occurs if the maximum channel code rate limit of the wireless device minus the amount is one of greater than or equal to a minimum level on the maximum channel code rate limit.

27. The method of claim 25, wherein the amount is a predetermined amount for the decrease of the maximum channel code rate limit.

28. The method of claim 25, wherein the amount for the decrease of the maximum channel code rate limit is an amount where the modified maximum channel rate limit is reached in a later data block selection.

29. The method of claim 16, wherein the at least one indication of reception of the at least one data transmission by the wireless device is a plurality of indications of reception; and
the modifying of the maximum channel code rate limit occurs in response to receiving the plurality of indications of reception.

30. The method of claim 16, further comprising:
transmitting, to the wireless device, at least one data transmission coded at the modified maximum channel code rate;
receiving at least one positive indication of reception of the at least one data transmission coded at the modified maximum channel code rate by the wireless device; and
in response to receiving the at least one positive indication of reception associated with the at least one data transmission coded at the modified maximum channel code rate, increasing the modified maximum channel code rate limit.

* * * * *